United States Patent
Mäenpää et al.

(10) Patent No.: US 8,495,130 B2
(45) Date of Patent: Jul. 23, 2013

(54) METHOD AND ARRANGEMENT FOR LOCATING SERVICES IN A PEER-TO-PEER NETWORK

(75) Inventors: Jouni Mäenpää, Nummela (FI); Jani Hautakorpi, Masala (FI); Ari Keränen, Kirkkonummi (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/498,323

(22) PCT Filed: Oct. 21, 2009

(86) PCT No.: PCT/SE2009/051197
§ 371 (c)(1),
(2), (4) Date: Mar. 26, 2012

(87) PCT Pub. No.: WO2011/049491
PCT Pub. Date: Apr. 28, 2011

(65) Prior Publication Data
US 2012/0197962 A1    Aug. 2, 2012

(51) Int. Cl.
*G06F 15/16*    (2006.01)
(52) U.S. Cl.
USPC ........... 709/201; 709/213; 709/217; 709/238; 709/251
(58) Field of Classification Search
USPC .................. 709/201, 204, 212, 213, 217, 225, 709/238, 251; 711/147; 712/28
See application file for complete search history.

(56) References Cited

PUBLICATIONS

International Search Report and Written Opinion, Application No. PCT/SE2009/051197, dated Jul. 19, 2010, 13 pages.
International Preliminary Report on Patentability, Application No. PCT/SE2009/051197, dated Dec. 19, 2011, 6 pages.
Mande Xie et al., "An Exhaustive Resource Search Algorithm Based on Ping-Pang Mapping", Dec. 12, 2008, 5 pages, 2008 International Conference on Computer Science and Software Engineering, IEEE.
Xucheng Luo et al., "DHT-Assisted Probabilistic Exhaustive Search in Unstructured P2P Networks", Apr. 14, 2008, 9 pages, IEEE.
Vladimir Vishnevsky et al., "Scalable Blind Search and Broadcasting Over Distributed Hash Tables", Jan. 18, 2008, pp. 292-303, Computer Communications 31, Elsevier Science BV.
Stoica, Ion, et al., "Chord: A Scalable Peer-to Peer Lookup Protocol for Internet Applications", IEEE/ACM Transactions on Networking, vol. 11, No. 1, Feb. 2003, 16 pages.

*Primary Examiner* — Jerry Dennison
*Assistant Examiner* — Davoud Zand
(74) *Attorney, Agent, or Firm* — Blakely Sokoloff Taylor & Zafman

(57) ABSTRACT

The present invention relates to methods and arrangements for locating services in a structured peer-to-peer distributed hash table, DHT, based, overlay communication network (310). The invention comprises two inter-related methods and nodes. The first method is used by a service node (321) to "advertise" to the overlay network (310) that it is providing a particular service (S1). This is done by distributing instances (351,352,353) of a service object (O1) that are stored in different nodes (331,332,333) in the overlay network (310) and where the instances (351,352,353) comprise an address to the service node (321). The other method is to locate at least one of these instances (351,352,353) with a predetermined probability and with a predetermined number of location request messages (390) from a user node (311) wishing to use the particular service (S1).

18 Claims, 10 Drawing Sheets

METHOD AND ARRANGEMENT FOR LOCATING SERVICES IN A PEER-TO-PEER NETWORK

CROSS-REFERENCE TO RELATED APPLICATIONS

This application is a National stage of International Application No. PCT/SE2009/051197, filed Oct. 21, 2009, which is hereby incorporated by reference.

TECHNICAL FIELD

The present invention relates to a method and an arrangement for locating services in a peer-to-peer network.

BACKGROUND

The storing of information in a network has traditionally followed the client-server model, i.e. the information is stored centrally in servers which are accessible by a number of clients. Typical examples are web servers that are accessible over the Internet from clients (home computers, mobile devices etc) located all over the world. The client-server model has more and more been challenged by the peer-to-peer (P2P) model. In contrast to the client-server model the peer-to-peer model has no distinction between clients and servers in the network. A node (also called a peer) can be both a client and a server at the same time and can access information stored in other nodes and provide information to other nodes. A network comprising these nodes/peers is called a peer-to-peer (P2P) network. P2P networks are usually overlay networks on top on an existing IP network such as the Internet. A well known example of a P2P network is the set of nodes (such as personal computers) connected to each other using the P2P protocol BitTorrent.

One advantage with P2P networks is that information (here also called objects) can be distributed. The information is not located in a single point of failure such as the server in a client-server network. P2P networks are also more scalable than client-server networks. On the other hand, a search for an object in a client-server network is relatively easy whereas a search for an object in a P2P network is more complex. The problem is to find out in which node the requested object is located. One technique is flooding, that is to send a search message to all nodes in the network. This is a simple technique but limited to very small networks. For larger networks the traffic load generated by the search messages will become very large. To overcome this, the BitTorrent network comprises a centralized server called a BitTorrent tracker. This tracker keeps information about where (in which nodes) the objects are located. Again, if only one tracker is used it becomes a single point of failure. This means that this tracker needs to be very reliable and have a large processing capacity to avoid to become overloaded when the network grows.

In order to design a 'flat' structured overlay network (without a centralized tracker) other techniques for locating information have to be used. One technique that has been suggested is to use key-based routing, also known as Distributed Hash Tables (DHT). A regular, non-distributed hash table is a data structure that associates keys with values. A key can be for instance a person's name and the corresponding value of that person's contact address (e.g., email address or Session Initiation Protocol (SIP) Uniform Resource Identifier (URI)). The primary operation a hash table supports is lookup; given a key, the hash table finds the corresponding value. Distributed Hash Tables (DHTs) provide a lookup service similar to a hash table. However, unlike regular hash tables, DHTs are decentralized distributed systems. In a DHT, the responsibility for maintaining mappings from names to values is distributed among the nodes participating in the system. This is achieved by partitioning the key space among the participating nodes. The nodes are connected together by the overlay network, which allows the nodes to find the owner of any given key in the key space. The partitioning of the key space can for instance use a ring topology. A DHT ring has for example been discussed in the paper "Chord: A scalable Peer-to-peer Lookup Protocol for Internet Applications" by Ian Stoica et al published in 2001 in relation to the SIGCOMM '01 conference. In this paper a DHT ring topology is disclosed. Each node is organized on this ring and is in charge of a set of keys.

The nodes in a P2P network are however not limited to store contact information for certain persons etc. The nodes can also be service nodes (providing services to other nodes) and nodes that request services from other nodes. An example of a P2P overlay network with services is the Peer-to-Peer Session Initiation Protocol (P2PSIP) overlay network. This overlay network can for example offer a TURN relay service (TURN=Traversal Using Relays around Network Address Translation), a voice mail service, a gateway location service, and a transcoding service.

If DHT is to be used for locating service nodes, one approach is to use the name of the service as the key, or rather a hash of the service name such as hash('voice mail service').

A problem with this solution is that it does not scale very well. The number of nodes providing a specific service is often very small compared to the total numbers of nodes in the overlay network. This means that a lot of service lookups (or service location requests) need to be distributed in the overlay network. In addition all service providers have to use the same key. As the corresponding contact addresses to the service providers are stored in the same node, this means that the node has to store a lot of contact addresses and will become overloaded.

SUMMARY

It is the object of the present invention to avoid the scalability problems mentioned above.

The invention comprises two inter-related methods. The first method is used by a service node to 'advertise' to the P2P overlay network that it is providing a particular service. This is done by distributing a plurality of instances of a service object to different nodes in the overlay network and where the instances comprise an address to the service node. The other method is to locate these instances from a user node wishing to use the particular service in the overlay network.

The method of distributing the instances of service objects comprises the initial step of configuring a service object so that it comprises an address to the service node itself.

The next step is to ensure that enough instances of the service object are created and distributed in the overlay network. The number of instances is calculated based on the criteria that they can be found with a predefined probability by a user node that is sending a predefined number of locations requests. One option is to use an algorithm where the number of instances R is calculated from the equation:

$$R = \frac{-\ln(1-p) \times N}{\frac{1}{2} M \times \log_2(N) \times S \times (F+1)}$$

where p is predefined probability, N is the number of nodes in the P2P network, M is the number of identical service location requests sent from the user node, F is a replication factor, and S is the total number of service nodes providing the same service.

In the method for locating a particular service, the starting point is to decouple the DHT routing from the key being searched for.

In the invention two types of keys are used. One type is the routing key and the other type is the search key. The search key is the service identifier, i.e. an identifier for a particular service (e.g. 'voice mail'). This service identifier can have an arbitrary value and different service providers can use different identifiers. The method uses a plurality of routing keys. These keys are determined by grouping the total set of object identifiers in the overlay network into a number M of ranges. If for example the overlay network has a ring topology, the object identifiers on the ring is divided in M ranges (or sectors). For each range a sector head node is assigned having an object identifier within the range. For example, if the user node has a connection to another node within a range, this node is assigned as sector head node. For the other ranges the node with the first object identifier in that range is assigned as sector head node. The object identifier for the sector head is used as the routing key. The user node then sends a service location request comprising the service identifier towards each one of the M sector head nodes and waits for the reception of at least one service location response message.

The invention further includes an adapted service node and an adapted user node.

The service node comprises means (such as a processor) for configuring a service object so that it comprises an address to the service node itself. The means are further adapted to create enough instances of the service object to be distributed among the nodes in the overlay network so that any of the instances can be located with a predetermined probability and with a predetermined number of service location requests from a user node. The service node further comprises means (such as a signaling interface) adapted to communicate with the processor and further adapted to distribute the instances of the service object among the nodes in the overlay network.

The user node comprises means (such as a processor) for grouping the object identifiers in the overlay network into ranges and to assign each range a sector head node. The user node further comprises means (e.g. a signaling interface) to send service location requests comprising a service identifier towards the sector head nodes and to receive service location response messages.

There are a number of advantages with the invention. The methods evenly distributes the load between the nodes that store the service object instances and without flooding. The methods do also distribute the load evenly between the service nodes. With the methods and the user and service nodes adapted according to the current invention, it is possible to locate a service node from a user node with a high probability and in a reasonable amount of time even if the density of service nodes is low. The invention scales to P2P networks of different sizes and support an arbitrary number of services.

DETAILED DESCRIPTION

Figure 1A:
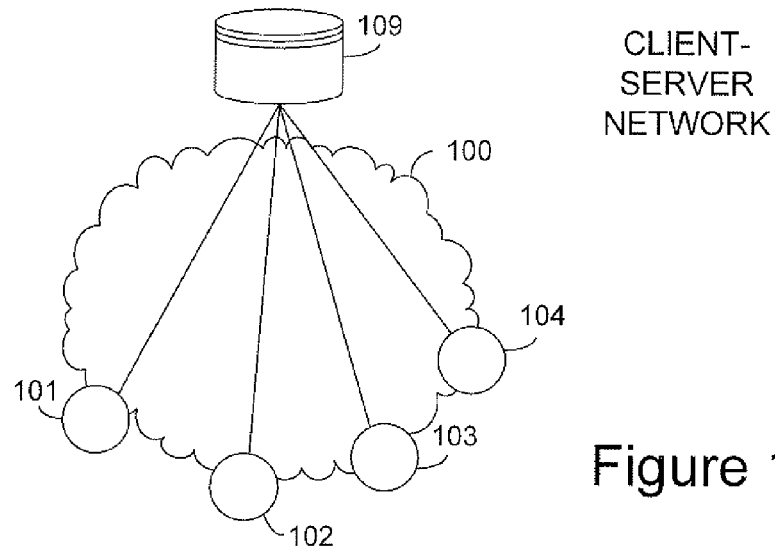
FIGS. 1A and 1B are block diagrams showing typical client-server and P2P network scenarios.
Figure 1B:
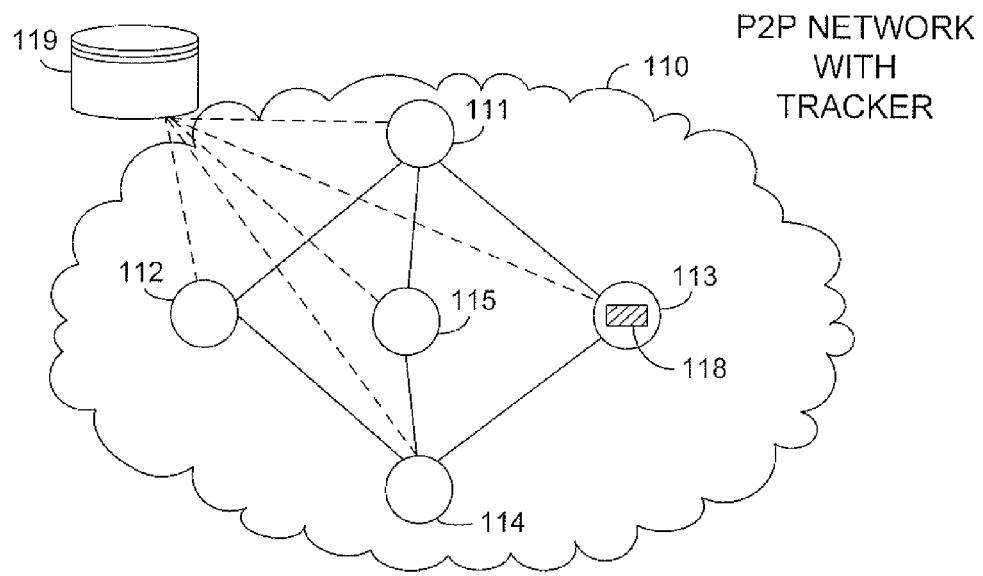
Figure 2A:
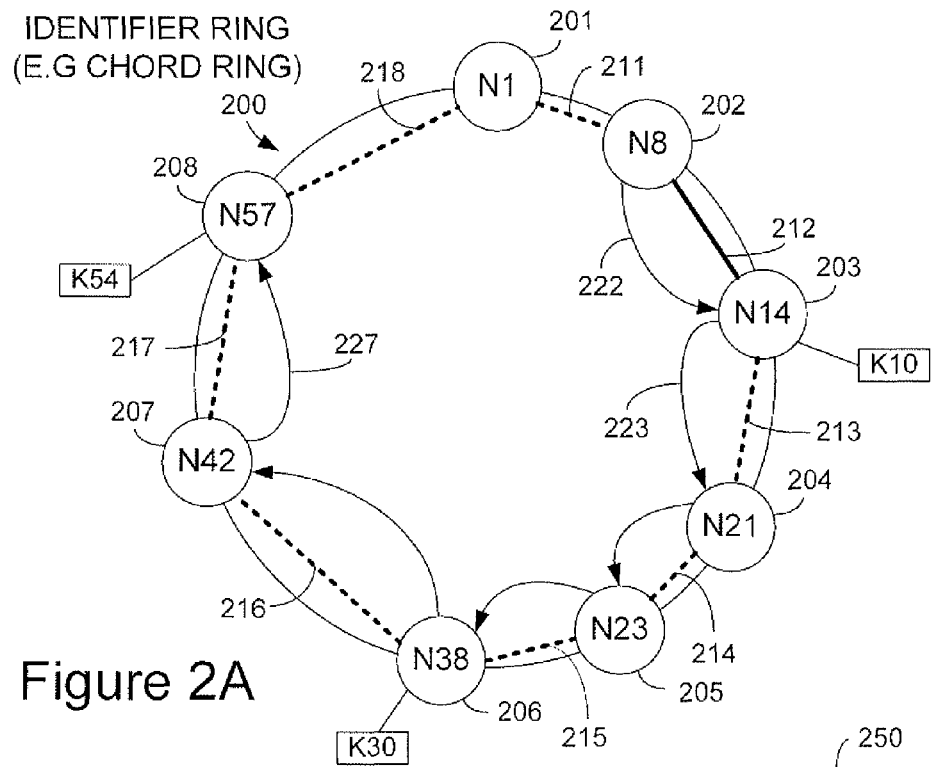
FIGS. 2A and 2B are block diagrams illustrating two search algorithms based on the DHT principle.

Traditionally networks storing information or objects are configured as client-server networks. FIG. 1A illustrates such a network 100 with a centralized server 109 to which a plurality of clients 101,102,103,104 are connected. A typical example is a web server that is accessible over the Internet from personal computers, mobile devices etc located all over the world. A problem with a centralized server is that it is a single point of failure and it need to store a lot of information. FIG. 1B illustrates on the other hand a peer-to-peer (P2P) network 110. This network 110 comprises a number of nodes also called peers 111-115 connected to each other. In this description, the terms node and peer are equally used. The P2P network 110 is normally an overlay network on top on a TCP/IP network such as the Internet. Each peer 111-115 can be both client and server at the same time. No centralized server to store the information or the objects is necessary as the objects are distributed among these peers 111-115 which could be personal computers, mobile devices etc. Theoretically all peers 111-115 can be connected to each other in a fully meshed network but when the network becomes large this will be too costly. A typical example of a P2P network is BitTorrent where an object 118 can be stored in at least one of the peers 113. This peer 113 is also called a seeder. In order to know in which peer to find the object 118, the BitTorrent network also comprises a tracker 119 which basically is a centralized server comprising information about where, in which peer, to find the object 118. Again, the centralized tracker 119 is a single point of failure and need to be very reliable. To build a flat P2P network without centralized servers it requires that each peer 111-115 have the ability to locate the object 118 themselves. One solution is to use an algorithm called key-based routing or Distributed Hash Tables (DHT). Different DHT algorithms have been devised such as Chord, Pastry and Kademlia. The P2PSIP protocol for example relies on the algorithm Chord. In the Chord algorithm, the peers (nodes) are organized on an identifier ring also called a Chord ring. A simplified example of such an identifier ring 200 is illustrated by FIG. 2A. In reality an identifier ring can comprise thousands or millions of nodes. Each node 201-208 in FIG. 2A is organized on the identifier ring 200 and given an identifier N1, N8, N14, N21, N23, N38, N42, N57. These identifiers are for example created by hashing the IP address of each node using a hashing algorithm such as SHA-1. Other methods are also possible, as hashing the public key of the user or using a central server that assigns the identifiers. The identifiers are ordered on the identifier ring 200 module $2^m$ where m is the identifier length. In FIG. 2A the identifier length is m=6 which means that the identifiers N1, N8 etc can be from 0 to 63 (0 to $2^m-1$). The objects stored in the nodes 201-208 are given object identifiers (also called keys k) by hashing the URI address of the object or by hashing some other data assigned to the object. If the URI address is hashed, the resulting identifier value has an identifier length of m=160. The hashing includes the mapping of the keys to the nodes 201-208 responsible for the keys. The key k is assigned to the first node 201-208 whose identifier N1, N8 etc is equal to or follows the key k. The nodes 201-208 on the Chord ring 200 store three keys K10, K30, K54 which consequently are assigned to the identifiers N14, N38, N57 respectively.

Figure 2B:
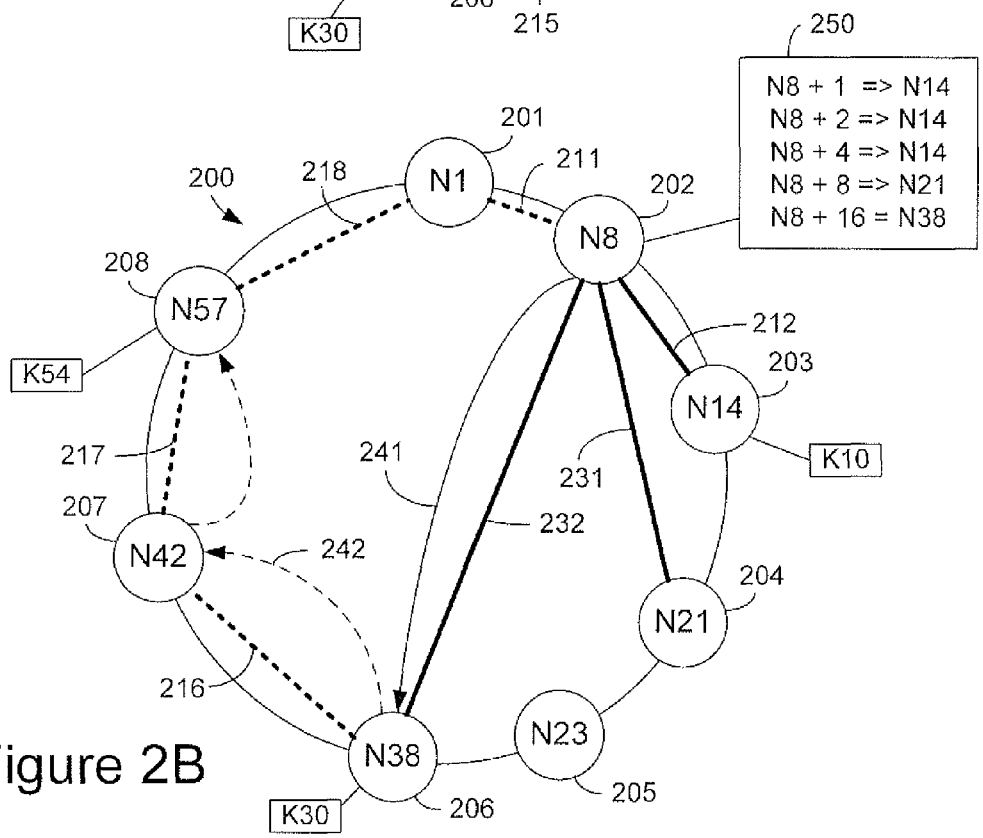

In FIG. 2A, each node 201-208 does only need to know how to contact its successor on the Chord ring 200 and has established a connection 211-218 to its successor. Assume now that an application within node 202 (having the identifier N8) needs to locate the key K54. According to the traditional DHT, a simple DHT search algorithm is to send a search 222 to its successor node on the identifier ring, in this case node 203 (having the identifier N14). Node 203 will in turn forward the search 223 to its successor, node 204 and so on until the search 227 reaches node 208 (having the identifier N57) to which the key K54 is assigned. The reply (not shown) is returned along the reverse of the path followed by the search. However, this algorithm is not very fast as it visits every consecutive node on the identifier ring 200 until it finds the object K54. An alternative and a faster search algorithm is illustrated by FIG. 2B. In FIG. 2B, node 202 has a set of connections 212,231,232 established to a subset of nodes 203,204,206 close to node 202 on the identifier ring 200. In this algorithm node 202 uses a so called finger table 250. The finger table 250 is a sort of routing table on how to reach this subset of nodes 203,204,206.

The finger table 250 comprises five fingers. The first finger N8+1 points to node 203 with the identifier N14. N14 is the first identifier that succeeds $8+2^0$ mod 6=9. The second finger N8+2 points to the same node 203 with the identifier N14 as N14 is the first identifier that succeeds $8+2^1$ mod 6=10. The third finger N8+4 points to the same node 203 with the identifier N14 as N14 is the first identifier that succeeds $8+2^2$ mod 6=12. The fourth finger N8+8 points to node 204 with the identifier N21 as N21 is the first identifier that succeeds $8+2^3$ mod 6=16. Finally, the fifth finger points to node 206 with identifier N38 as N38 is the first identifier that succeeds $8+2^4$ mod $2^6$=24. As node 206 with identifier N38 is closest to the key K54, the search message 241 is sent to that node. Node 206 has a similar finger table (not shown) and forwards the search 242 to a third node 207 and so on. Eventually, node 202 receives a reply with information about the location of object K54. In addition to the finger table 250, the node 202 can also maintain a so called neighbor table. The neighbor table (not shown) comprises pointers to the immediate successors and predecessors (i.e. neighbors) to node 202.

If DHT is to be used for locating nodes (service nodes) that provide services to other nodes, one approach is to use the service name as the key, or rather a hash of the service name such as hash('voice mail service').

A problem with this solution is that it does not scale very well. All service providers have to use the same key and the corresponding contact addresses to the service providers are stored in the same node. This means that the node storing the contact addresses will become overloaded as the size of the network grows.

Figure 3:
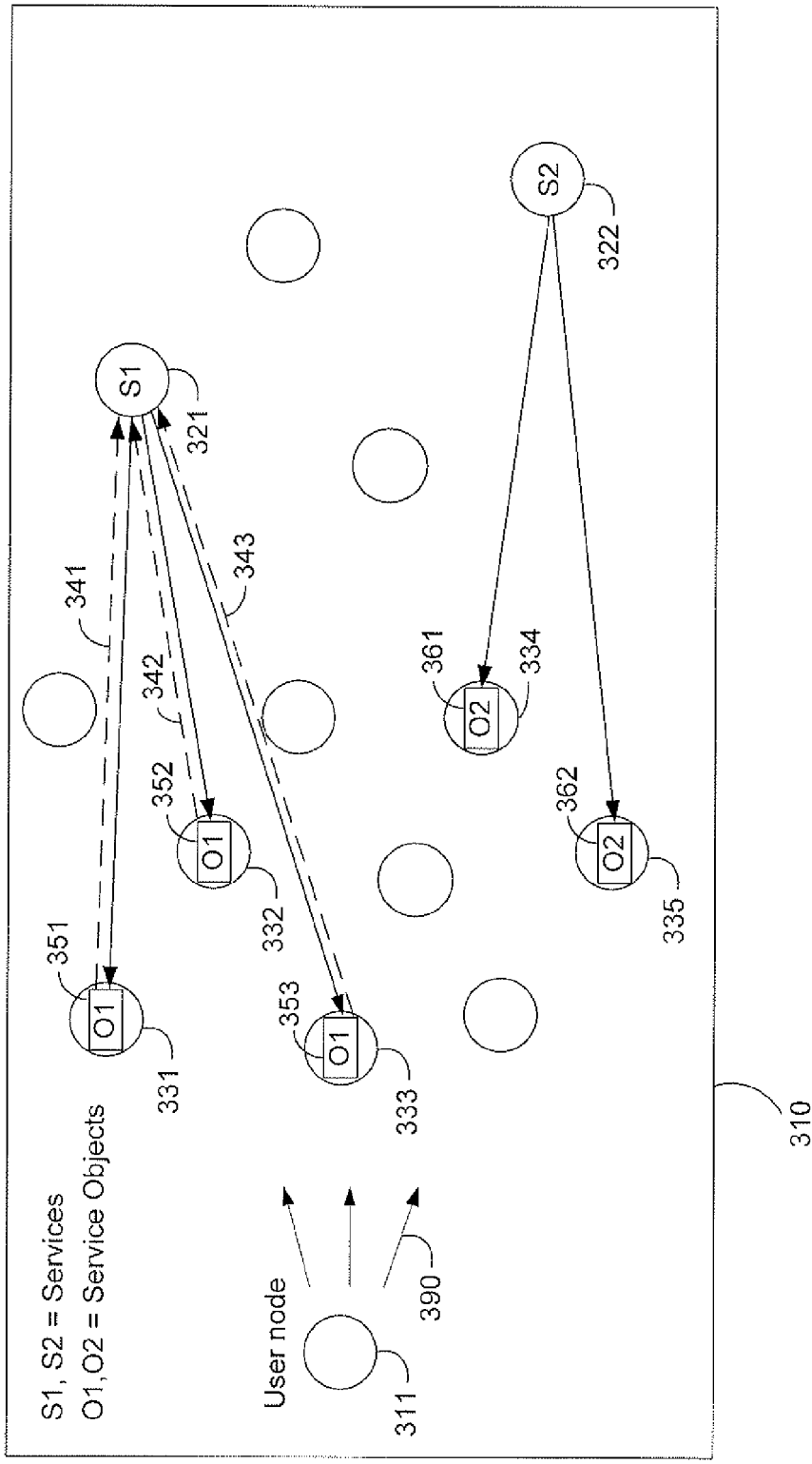
FIG. 3 is a block diagram illustrating a P2P overlay network with a number of service nodes distributing services objects according to the current invention.

The invention comprises solutions to these problems by using two inter-related methods:
A method for configuring service records in the P2P overlay network
A method for locating the service In the first method service nodes use service records to 'advertise' to the P2P overlay network that they are providing a particular service. The second method is how a user node finds a service in the overlay network by using the service records. FIG. 3 illustrates a simple example of a P2P overlay network 310 comprising N=14 nodes. For readability, any connections between the different nodes are left out from the figure. Two of the nodes 321,322 are service nodes. Service node 321 provides service S1 whereas service node 322 provides a different service S2. In order for a user node 311 to find any of these services S1,S2 quicker and with a reduced number of location requests, each service node 321,322 'advertise' their presence by distributing service records to different nodes in the overlay network 310. These service records are instances of a service object comprising an address pointing to the service node 321,322.

In FIG. 3, the service node 321 distributes three instances 351,352,353 of a service object O1 comprising the address of the service node 321 to nodes 331,332 and 333. Service node 322 distributes two instances 361,362 of a service object O2 comprising the address of the service node 322 to nodes 334 and 335. The user node 311 will now have a higher probability to find for example service S1 when sending location requests 390. Apart from the service node 321 itself, three nodes 331,332,333 now store pointers 341,342,343 to the service node 321. The same nodes 331,332,333 can each store a set of service records (not shown in FIG. 3) with addresses to different service nodes providing different services. This set of service records is also called a resource record table.

Figure 4:
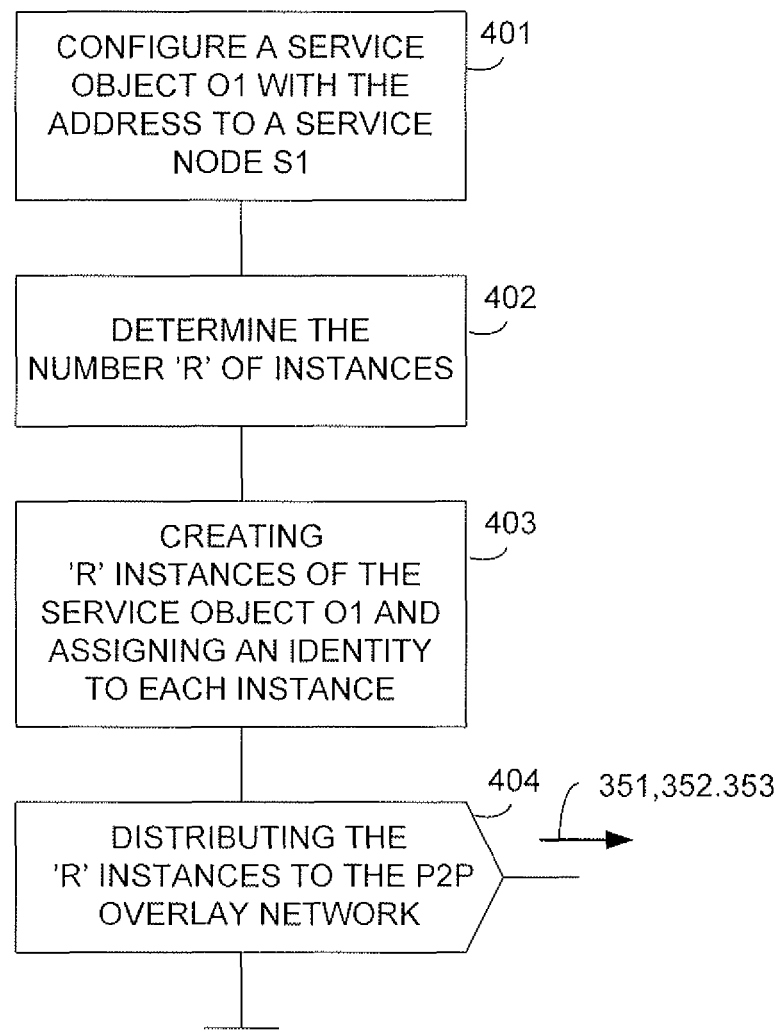
FIG. 4 is a flow chart showing the steps of creating and distributing service objects according to the current invention.

The method for distributing the instances of the service object is illustrated by the flow chart in FIG. 4. The method comprises the initial step 401 of configuring a service object O1 so that it comprises an address pointing to the service node 321 itself.

The next step 402 is to ensure that enough instances 351, 352,353 of the service object O1 are created and distributed in the overlay network 310 so that service users will have a high probability to find the service node 321 from the user node 311. The number R of instances is calculated based on the criteria that the instances can be found with a predefined probability p by a user node 311 that is sending a predefined number L of locations requests 390. The invention uses an algorithm based upon the so called birthday paradox which will be described in detail further below.

When the number of instances R of the service object has been determined in step 402, all R instances are created in step 403 and distributed in step 404 among the nodes 351,352,353 in the overlay network 310.

The term birthday paradox pertains to the striking probability that in a set of randomly chosen people some pair of them will have the same birthday. For example, in a group of at least 23 randomly chosen people, there is more than 50% probability that some pair of them will both have been born on the same day. For 57 or more people, the probability is more than 99%. The application of the birthday paradox to search algorithms is further disclosed in for example the paper 'Bubblestorm: resilient, probabilistic and exhaustive peer-to-peer search' by W. W. Terpstra at al published October 2007. In that paper it is shown that in a network with N nodes in which X nodes are storing a replica of object A and Y nodes are storing a replica of object B, the probability p that none of the N nodes are storing a replica of both object A and object B is less than $$p = e^{-\frac{XY}{N}} \qquad (1)$$

Alternatively, the probability that at least one of the nodes is storing both objects A and B is more than (1−P). Equation (1) is a consequence of the birthday paradox with the difference that we are only interested in pairs of objects in which one object is of type A and the other of type B. A prerequisite that equation (1) holds is that objects A and objects B are distributed uniformly among the nodes. Equation (1) could also be rewritten on the form $$X = \frac{-\ln(1-p) \times N}{Y} \qquad (2)$$

In the current invention we can think of object A as being the service record i.e. the instance of the service object and object B as being the lookup or service location request 390 for that service object O1. X is the number of instances of the service object O1 present in the overlay network 310 and Y is the number of service location requests 390 that need to be sent to find the instance of the service object O1 with probability (1−p).

As an example, if a 99% probability of finding an service object is desired in a 1000-node overlay network, and nodes are willing to do ten location requests to find an service object (i.e., Y=10), the network should contain around X=461 instances of the service object as calculated below:

$$X = \frac{-\ln(1-0.99) \times 1000}{10} \approx 461$$

In most DHT based networks, lookups visit on average the order of $\log_2(N)$ nodes. For example, in Chord DHT, the number of nodes each lookup visits on average is $$\text{visited nodes} = \frac{1}{2} \log_2(N) \qquad (3)$$

Thus using DHT always replicates any given lookup to on the order of log(N) nodes on average. To increase the number of nodes a location request visit, each node receiving a location request from an 'upstream' node could replicate the request to K 'downstream' nodes instead of just one node. In this case, the number of nodes a location request visits grows to $$\text{visited nodes} = \left(\frac{1}{2} \log_2(N)\right)^K - 1 \qquad (4)$$

However, for some networks one may choose to set K to value 1 or to some other reasonably low value. If a large value is used for K, there might be a risk that the algorithm is used as an amplification attack mechanism. In a preferred embodiment we assume that and thus do not include K in the equations below.

Further, a user node 311 wishing to locate a service S1 can send M parallel location requests to speed up the service discovery process. Thus, by taking into account M and the average number of nodes a location request visits, we can calculate L (i.e., the number of nodes a location request visits in total) as follows:

$$L = \frac{1}{2} M \times \log_2(N) \qquad (5)$$

where M is the number of parallel location requests sent and N is the total number of nodes in the overlay network. The value of M must be a power of two and it must be equal to or smaller than the size of the finger table. As will be described later, the coverage of the algorithm is greatest in the identifier space when M equals the size of the finger table. The second inter-related method (described further below) ensures that the same location request is not received by the same node multiple times.

The number of service nodes providing service of a specific service type can be calculated simply as:

$$\text{service nodes } S = N \times D \qquad (6)$$

where D is the service node density. By using Equation 2 and Equation 5, we can calculate R (i.e., the number of service records that need to be stored in the overlay network) as:

$$R = \frac{-\ln(1-p) \times N}{L} = \frac{-\ln(1-p) \times N}{\frac{1}{2} M \times \log_2(N)} \qquad (7)$$

Finally, when taking into account data replication in the DHT and the number of service nodes present, the formula each service provider can use to calculate the number of service records it needs to store in the overlay network can be calculated as:

$$R = \frac{-\ln(1-p)}{\frac{1}{2} M \times \log_2(N) \times D \times (F+1)} = \frac{-\ln(1-p) \times N}{\frac{1}{2} M \times \log_2(N) \times S \times (F+1)} \qquad (8)$$

where p is the desired success rate. N, M, F are integers where N is the number of nodes in the overlay network, M is the number of parallel location requests sent and F is the data replication factor. D is the service node density. Note that we assume a data replication strategy that distributes the replicas uniformly in the identifier space. If a replication strategy that does not have this property is used, F should be set to zero.

As an example, if a p=99% probability of finding a node providing a service S1 is desired in a 1000-node system, the percentage of nodes acting as service nodes (density) is D=1% (i.e., there are only 10 service nodes in the whole network), the number of parallel location requests is M=5, and the replication factor used in the overlay is F=5, the number of service records each service node needs to store in the overlay network is R=3.

A service node 321,322 having a multiple of service records 351,352,353 pointing to itself stored in the overlay network 310 must assign a unique identifier (i.e., key) to each of the service records 351,352,353. The uniqueness of each key can be ensured by constructing the identifiers of the service records 351,352,353 as follows:

Service_record_ID=hash(service_node_ID+ service_type+i)

where the 'service_node_ID' is the identifier of the service node 321,322, 'service_type' is the type of the service being provided, and 'i' is a number that is unique for each service record the node 331,332,333 stores.

A service node 321,322 can in one embodiment remember the service record IDs it has stored in the overlay network 310 and remove them before it departs from the network 310. In the same or another embodiment, each service record 351, 352,353 stored in the overlay network 310 expires unless it is refreshed periodically. The purpose of this is to ensure that the overlay network 310 does not contain stale service records. Thus, each service node 321,322 needs to periodically re-execute the algorithm described above and store fresh service records in the overlay network 310. This procedure also ensures that at any given point in time, the overlay network 310 contains an appropriate number of service records as the size of the overlay network 310 may vary with time.

The parameters success probability p, parallel lookups M, and replication factor F are fixed, that is, they are set when configuring the overlay network 310 and don't change.

The parameter N reflects the current size of the overlay network 310, and its value can be estimated by each node whenever the algorithm described above is invoked. To estimate the size of the overlay network 310, any existing overlay size estimation algorithm can be used. For instance, in the case of the Chord and Pastry DHT algorithms, the density of node identities in the neighborhood table can be used to produce an estimate of the network size. This is further described in the paper 'Controlling the cost of reliability in peer-to-peer overlays' by R Mahajan et al. The benefit of this approach is that the estimate can be produced by using only locally available information.

The parameter density D is initialized by setting it to the estimated minimum (worst case) density of service nodes. This estimate can be corrected during runtime using Service Probe requests that are described further below in the section about further optimizations.

The algorithms described above assume that service records are uniformly distributed i.e. evenly spaced among the nodes in the overlay network. This distribution can be done using different techniques. If the DHT uses a load balancing mechanism such as the one specified in the paper "Chord: A scalable Peer-to-peer Lockup Protocol for Internet Applications", the distribution of service records becomes very close to uniform. If no load balancing is being used in the overlay network, the mechanism described below can be used.

Every node in the overlay network can calculate the number of service records it would be storing in an ideal network as follows:

$$\text{my records} = \frac{R}{N}, \tag{9}$$

in which N is the total number of nodes in the overlay network and R is the total number of service records in the overlay network. The value of R can be obtained by using Equation 2 and an estimate of N can be estimated as described above. If the value calculated using Equation 9 is smaller than 1, a value of 1 should be used for the 'my records' parameter.

If a node that is already storing a number of service records of certain type equal to the value of the 'my records' parameter receives a request to store an additional service record of the same type, it should reject the request. In the reject response, the node should indicate that it is already storing the maximum number of service records. Upon receiving such a response, the node that issued the store request should calculate a new identifier for the service record and send a new store request addressed to this new identifier. This ensures a more uniform distribution of service records in the overlay network.

In the second inter-related method for locating a service, the main principle is to decouple the DHT routing from the key being searched for. Two types of keys are used. One type is the routing key and the other type is the search key. The search key is the service type for the requested service. Each service type is uniquely identified by a service identifier (e.g. 'voice mail'). This service identifier can have an arbitrary value and different service providers can use different identifiers.

The method for locating the service object instances 351, 352,353 is to use a plurality of routing keys. These keys are determined by grouping the total set of object identifiers in the overlay network into a number M of ranges. If for example the overlay network has a ring topology, the object identifiers on the ring is divided in M ranges (or sectors). This is illustrated by an example in FIG. 5.

Figure 5:
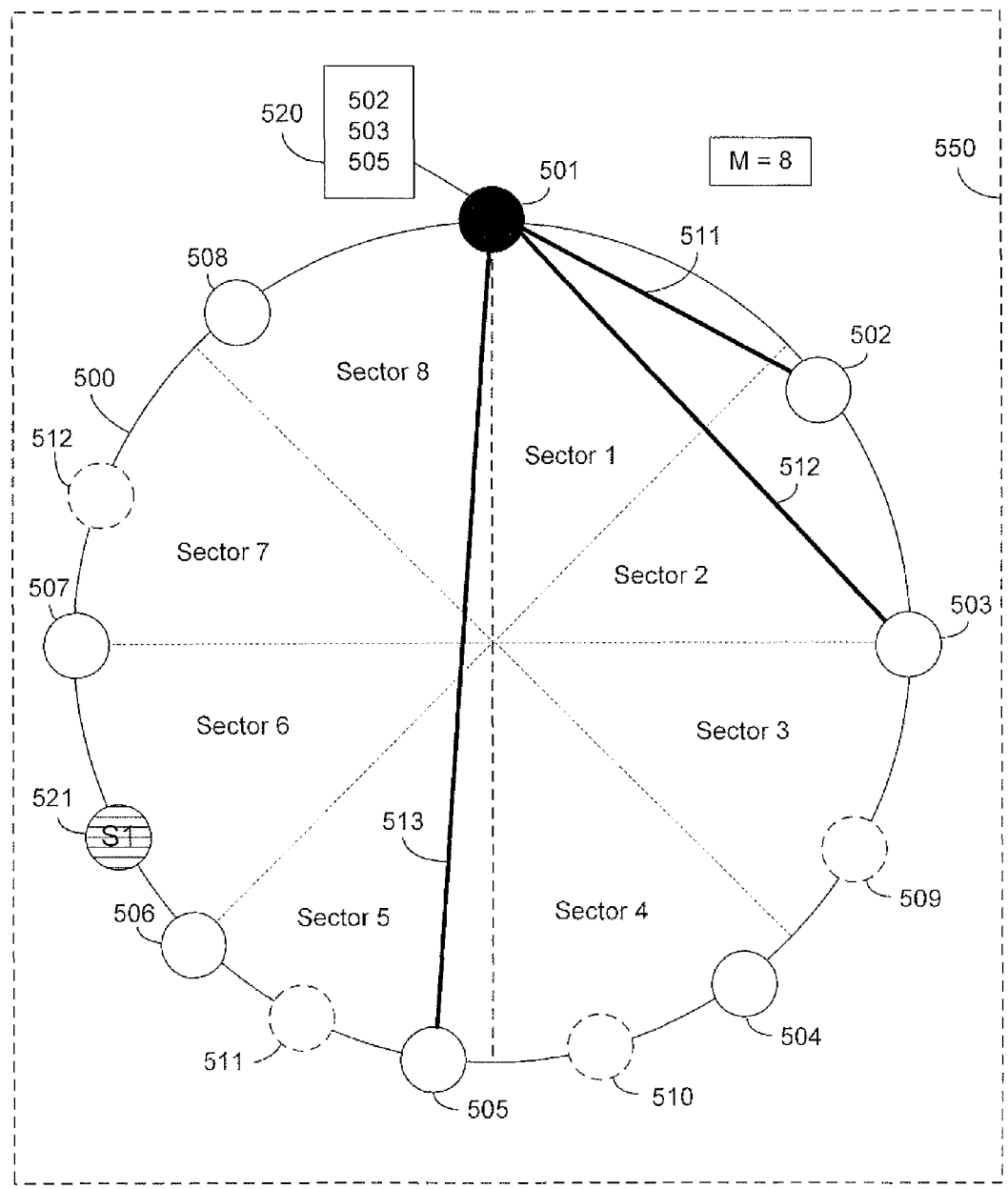
FIG. 5 is a block diagram illustrating a DHT ring divided into ranges (sectors) according to the current invention.

FIG. 5 illustrates a DHT identifier ring 500 in an overlay network 550. On the DHT identifier ring 500, 15 nodes are organized; a user node 501, a service node 521, seven sector head nodes 502-508 and a number of other nodes 509-512. The user node has a finger table 520 comprising routing information to nodes 502,503,505 to which the user node 501 is connected by the connections 511,512,513 respectively. In FIG. 5, the user node 501 has divided the DHT identifier ring 500 into M different sectors (in this example M=8 sectors Sector1-8). Each Sector(n) (where $1 \leq n \leq M$) starts from a start object identifier $S_n$ calculated as follows:

$$S_n = X + (n-1) \times \frac{2^b}{M} \tag{10}$$

where X is the user node's 501 own object identifier, b is the number of bits in the binary representation of the object identifiers on the DHT identifier ring 500. Note that since the starting positions of the sectors are determined by user node's 501 own object identifier, each node in the overlay network may calculate the sectors differently when they are user nodes.

Figure 6:
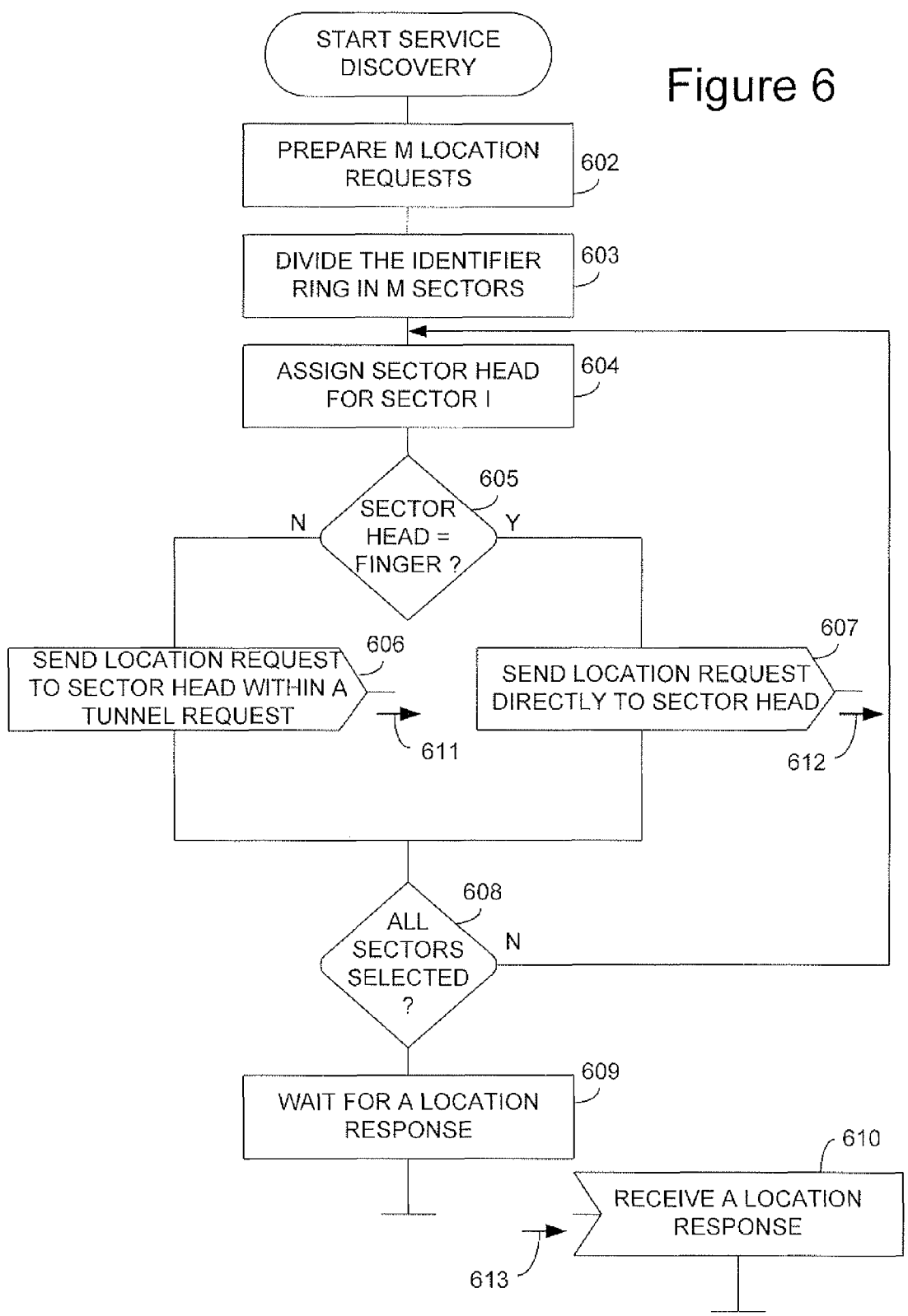
FIG. 6 is a flow chart showing the steps of locating a service node from a user node according to the current invention.

The purpose of dividing the overlay ring into separate sectors is to ensure that the M location requests will be propagated within separate parts of the identifier space of the identifier ring 500. The method is described more in detail by the flow chart in FIG. 6. The user node 501 starts in step 602 to prepare M location requests 611,612. Again, the value M can be given a fixed value when configuring the overlay network 550. In step 603 the identifier ring 500 is divided in M sectors as described above.

Once the sectors Sector1-8 have been created, the user node 501 assigns in steps 604 and 608 one node from each one of the M sectors Sector1-8 as a sector head 502-508.

Each sector head 502-508 should have an object identifier that is the closest successor of the object identifier from which the range starts. Because of the way the sectors were calculated, some of the sector heads will be the same nodes as addressed by the finger table 520 the user node 501 maintains (in the case of the example shown in FIG. 5, the sector heads 502,503,505 of sectors 2, 3, and 5 are the same as the nodes addressed by the finger table 550).

If it is determined in step 605 that the sector head 502,503, 505 also corresponds to a finger 511,512,513 in a finger table 520 in the user node 501, the location request 612 is sent directly to the sector head 502,503,505 in step 607. If the sector head is not be present in the finger table 520, the user node 501 inserts in step 606 the location request into the payload of a Tunnel request 611 and addresses the Tunnel request 611 to the node having the object identifier that is the closest successor of the object identifier from which the range starts from which the range starts. A Tunnel request is simply a request that carries another message in its payload.

This means that the Tunnel request will be routed across the overlay network 550 to the closest successor of the object identifier from which the range starts. Upon reception of the Tunnel request, the sector head will inspect the payload of the Tunnel request, notice the encapsulated location request, and forward the request to another node within the sector. The process of propagating the location request within the sector is described more in detail below. Some of the location requests may get routed via the same finger. In this case, multiple location requests can be placed within the payload of the same Tunnel request.

In step 609 the user node waits for a response 613 which is received in step 610.

The location request can be sent either in parallel or sequentially and contains the fields specified in Table 1 below:

TABLE 1

| Field | Description |
|---|---|
| min-ID | The first object identifier belonging to the sector (first in the range). This parameter is only present in location requests sent to sector heads. |
| max-ID | The last ID that belongs to the sector (last in the range). This parameter is only present in location requests sent to sector heads. |
| destination list | A list containing the nodes that should receive this location request. The destination list is used for source routing. This field is not present in location request sent to a sector head. |
| TTL | Time-To-Live value. In the case of the Chord DHT, the TTL variable is initialized to value ½log (N) + 1. |
| originator | The object identifier of the node that originated the location request (according to the algorithm in the current invention). |

Figure 7:
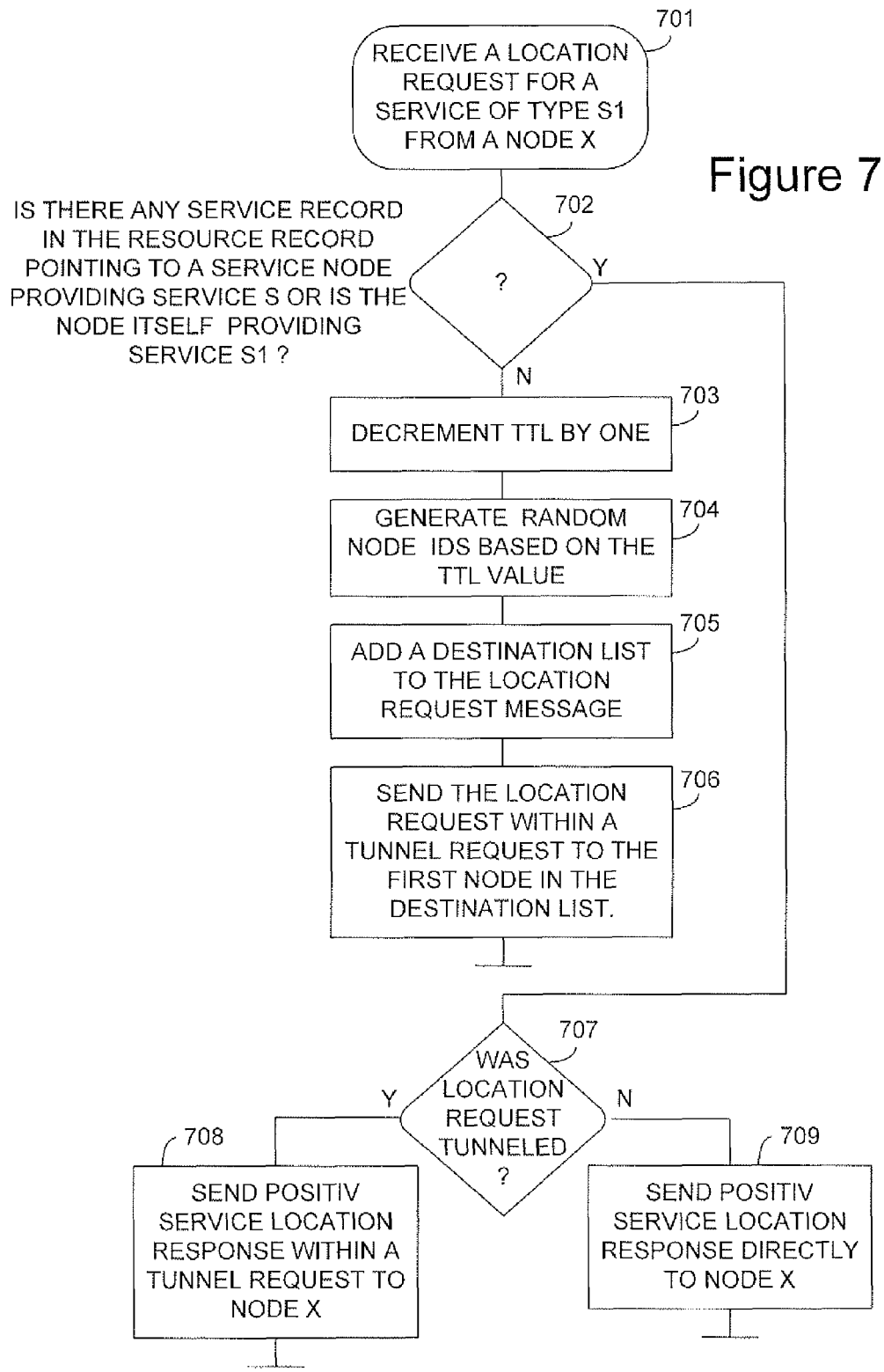
FIGS. 7 and 8 are flow charts showing the steps of receiving a location request at an intermediate node according to the current invention.

As described above, a sector head (let's called it node Y) is the first node within a sector that receives the location request from the user node (let's called it node X). The procedure when the sector head Y receives a location request is illustrated in FIG. 7. A node Y can determine if it is a sector head or not from the absence or presence of the destination list field (as described in Table 1, location requests whose recipient is a sector head do not include a destination list). A sector head Y, upon receiving a location request in step 701 in FIG. 7, goes through the following steps.

If it is determined in step 702 that the sector head Y holds service records for the requested service type S1, the sector head Y does not forward the request, but immediately returns a location response carrying its service records. The sector head Y also returns a response if it is a service provider (service node) for the service being searched for. If it is determined in step 707 that the location request was received within a Tunnel message, the sector head Y encapsulates the response in another Tunnel message and routes it in step 708 across the overlay network back to node X. Otherwise it can in step 709 send the response directly to node X. If the sector head Y does not have any service records for the specified service type S1 and it is not a service provider for that service, it decrements in step 703 the TTL variable in the location request message by one.

Next, in step 704 the sector head Y generates a number of random identifiers equal to the remaining value of TTL from the interval (min-ID, max-ID). This ensures that the random node object identities are uniformly distributed within the sector. Next, in step 705 the sector head Y inserts a destination list into the location request. The destination list contains the randomly generated object identifiers in ascending order. The destination list specifies the path which the location request will follow within the sector.

In step 706 the sector head Y tunnels the location request to the node Z with the first node identity in the destination list. Note that the location requests sent by a sector head Y are always encapsulated in a Tunnel request. Note also that a sector head Y is not interested in receiving a response to the location request; there is no need to route service location responses through the sector heads.

Figure 8:
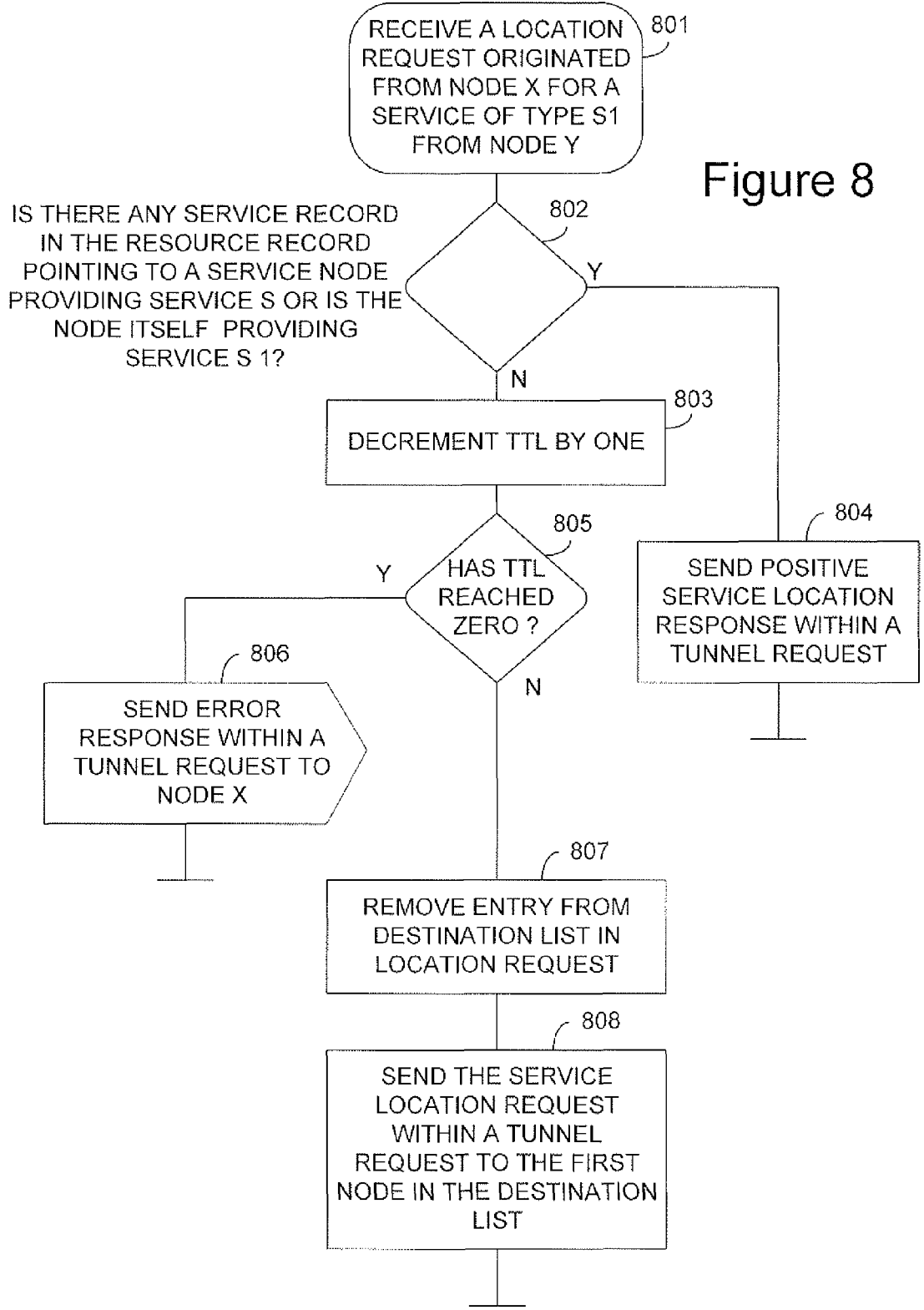

The procedure when a node Z that is receiving a tunnelled location request from a previous node Y but originating from node X is illustrated in FIG. 8. The previous node can be either a sector head Y or one of the nodes in the destination list in yet a previous node.

The node Z receiving a tunnelled location request in step 801 acts as follows. If it is determined in step 802 that node z is a service provider for the service type S1 specified in the location request or it is storing service records of that type, it generates in step 804 a positive location response message to the location request. The response is encapsulated in an outgoing Tunnel request whose target is node X, that is, the node that originated the location request (and not node Y from which the Tunnel request was received). Note that this means that the location response follows a different path through the overlay network than the location request (the intermediate nodes do not need to receive the response).

If node Z does not have any information about where the service S1 is located, it decrements in step 803 the TTL variable in the lookup request by one. If it determined in step 805 that the decremented TTL value is still larger than zero, node Z removes itself from the destination list in step 807 and encapsulates the location request in a new Tunnel request and sends it in step 808 to the next node in the destination list of the location request. Note that a location request forwarded by one of the nodes in the destination list is always sent encapsulated within a Tunnel request. The Tunnel request may visit multiple intermediate nodes in the overlay network as it proceeds from one destination list entry to the next. However, since it cannot be guaranteed that these intermediate nodes are selected uniformly at random, these intermediaries do not decrement the TTL value in the location request; only the nodes in the destination list (that are final recipients of Tunnel requests carrying the location requests) decrement the TTL.

If it determined in step 805 that the decremented TTL value request reaches zero, an error response is returned in step 806. The error response is encapsulated in a Tunnel request whose target is node X, that is, the node that originated the location request (and not the node Y who sent the Tunnel request).

The method in for locating a service S1, ends when node X has received a location response (either directly or within a Tunnel message) from all of the sectors. At this point, the probability that node X has successfully received a service record of the service node S1 is at least p. If the node X received multiple service records, it can in one embodiment of the invention select one of them at random and invoke the service in the node to which the service record points. Node X can also in another embodiment explicitly select a service node from a particular service provider and in yet another embodiment select one service node and cache the other returned service records for future use.

The application of equation 1 in the method for locating a service S1 assumes that the location requests are uniformly distributed within the overlay network. In the current invention, every sector of the overlay network/the DHT ring is selected with uniform probability. Also, within each sector, the object identifiers for the nodes to which the location request is source routed are selected in such a way that each identifier within the sector is selected with uniform probability. This ensures that location requests are distributed uniformly at random.

The two inter-related methods in the current invention i.e. the method for configuring service records in the P2P overlay network and the method for locating a service in that network can in some embodiments optionally be further optimized. A number of possible optimizations are described below.

Again, location requests and responses are sent encapsulated within Tunnel requests across the overlay network (with the first hop between the location request originator X and the sector head Y as a possible exception). The purpose of this is to ensure that location requests are uniformly distributed within the sectors. A Tunnel request carrying a location request or response may be forwarded by multiple intermediate nodes on its way from one destination list entry to the next destination list entry.

A simple optimization is possible if the nodes forwarding tunnel requests inspect the payloads of the requests:
1) An intermediate node detecting a location request encapsulated within a Tunnel request can check whether it has any service records of the desired type or whether it is itself providing the desired service. If the answer is yes, the intermediate node can generate a location answer message and tunnel it to the originator of the location request. If this is done, there is no need to forward the tunnel request further.
2) An intermediate node detecting a location error response within a tunnel request can check whether it has any service records of the desired type or whether it is itself providing the desired service. If the answer is yes, the intermediate node can change the type of location response to a success response, include a service record in the response, and route the tunnel request carrying the response to the next hop node.

This optimization can greatly increase the chances of finding a service node providing a service S1. If this mechanism is used, the probability of finding a service node will in many cases be higher than the probability p used in Equation 8. However, this cannot be guaranteed since the intermediaries forwarding the tunnel requests are not selected in a random fashion (only the nodes in the destination lists of location requests are). Therefore, in Equation 8, one should still assume that the probability of finding a service node is only p.

Each node in a structured overlay network maintains direct connections with the nodes included in its routing table (consisting of the finger table and the neighbour table). Typically, the routing table contains on the order of log(N) entries. To learn which services each service node that is being added to the routing table provides, a node can send it a request that is here referred to as the ServiceProbe request. A response to a ServiceProbe request simply includes the service identifiers of the service types for which the sender is acting as a service provider. This way a node learns which, if any, services its direct neighbours are providing. Whenever the node receives a location request for a service type that one of its neighbours is providing, the node can generate a service record pointing to its neighbour and return it in a positive location response. The benefit of this mechanism is that it can be used to speed up the service discovery process.

A node can also maintain a cache that contains service records that the node has recently seen in positive location responses it has forwarded towards a node carrying out the service discovery algorithm described above. If the node later on receives a location request for the same service type, it can, instead of forwarding the location request, use the records in the local cache to generate a positive location response. This mechanism has also the benefit of speeding up service discovery.

Of course, in a highly dynamic environment where nodes (including service nodes) are constantly joining and leaving the P2P overlay network, the downside of caching is that service records in the cache may point to nodes that have already left the overlay network. However, the probability that a cached service record is pointing to a dead node can be minimized if the node maintaining the cache carefully selects the entries it includes in the cache and if the lifetime of cache entries is chosen appropriately.

Service records (which normally include only the address information for locating a service node) can be extended by having them contain the uptime of the service node. The uptime is updated each time the service record is refreshed. The best records to cache are service records of service nodes with long uptimes, based on the observation that a node that has been present in the overlay network for a long time is less likely to leave the system than a node with a short uptime. A more accurate value for service node uptime can be obtained if the age of the service record is returned in the location response together with the service record.

The maximum time a service record is maintained in the cache can be determined in multiple ways. One option is to use a configured value. Another option is to set the caching time to a value shorter than:

$$T=\text{service record refresh interval} - \text{service record age}$$

This ensures that cached entries are not stored in the overlay network any longer than service records of nodes that have crashed. Finally, in a self-adaptive DHT in which nodes estimate the current churn rate, an appropriate value for the maximum caching time can be calculated based on the estimated churn rate.

The ServiceProbe requests discussed above provide a node with information on how many of its directly connected neighbours are service providers. This information could be used to estimate service node density. However, if the density is low, a larger set of nodes need to be queried to get a more reliable estimate.

What can be done is to extend ServiceProbe responses so that the sender of a ServiceProbe response returns, in addition to the service identifiers of the service types it provides, also the number of service nodes of each service type it has in its own routing (finger) table. When a node X calculates the service node density, it should use only the information returned by its nodes in the finger table (fingers). Information returned by successors and predecessor should not be used, because the routing tables of successors and predecessors overlap with the routing table of node X.

Finally, the mechanism described above can be extended to arbitrary depths, if need be. That is, a ServiceProbe response returned by a finger F can include also the service nodes present in the routing tables of F's fingers, etc. However, care should be taken to so that the same service nodes do not get counted multiple times if using depths larger than one.

The invention further includes an adapted service node 321 and an adapted user node 501. An embodiment of each of these nodes is illustrated by FIGS. 9 and 10 respectively.

Figure 9:
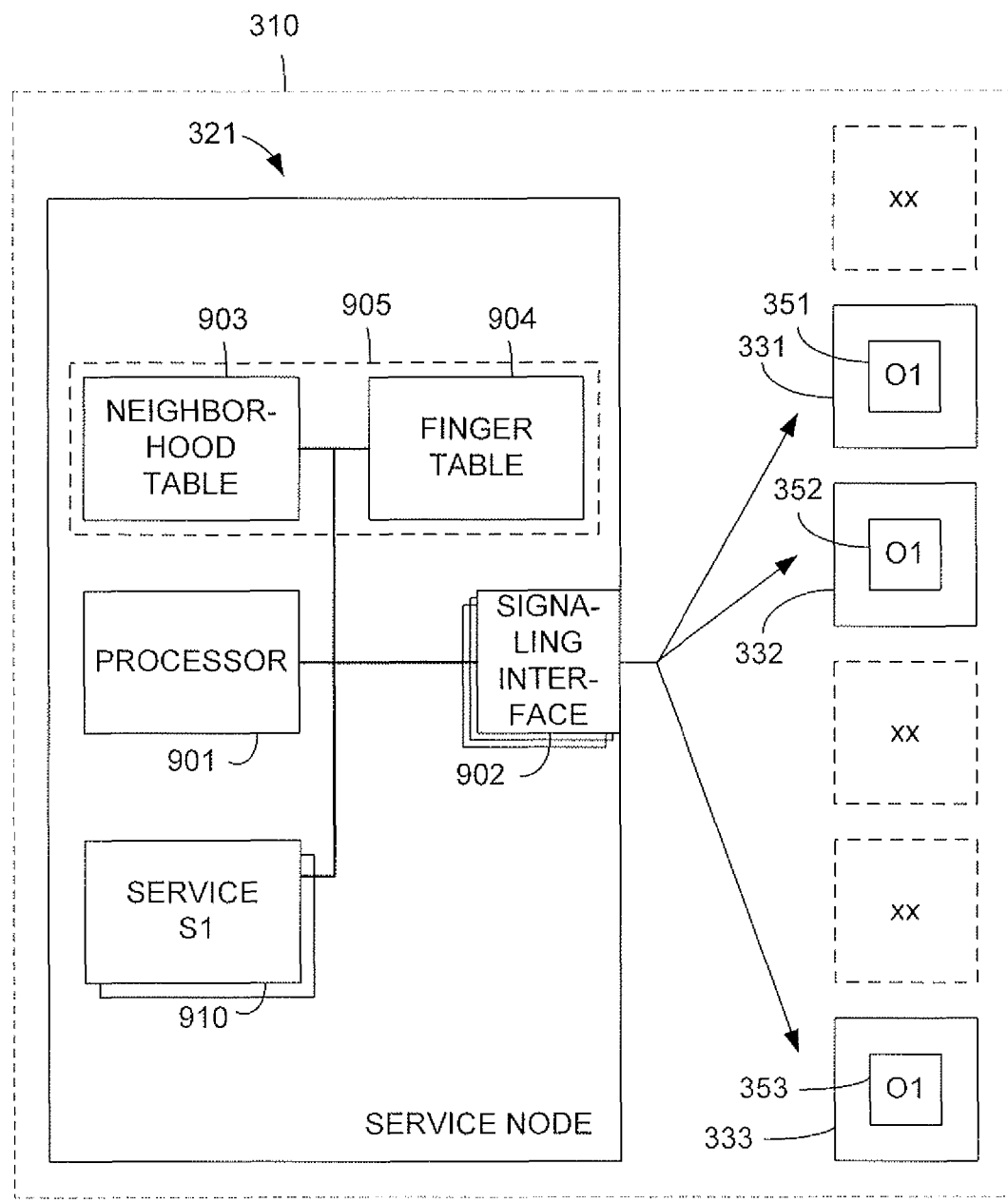
FIG. 9 is a block diagram illustrating a service node according to the current invention.

The service node 321 in FIG. 9 comprises a processor 901 which is adapted to communicate with one or several signaling interfaces 902 that are adapted to send and receive different signaling messages as described above. The processor 901 is programmed to perform the method of configuring a service object O1 so that it comprises an address to the service node 321 itself. The processor 901 is further adapted to create enough instances 351,352,353 of the service object O1 to be distributed among the nodes 331,332,333 in the overlay network 310 so that any of the instances 351,352,353 can be located with a predetermined probability and with a predetermined number of service location requests from the user node. The processor 901 is also adapted to communicate with a neighborhood table 903 and a finger table 904. The tables 903,904 could be implemented in one or several memory areas in a memory unit 905. The processor 901 is further adapted to communicate with one or several services S1 910. These services 910 can be accessed by other nodes in the overlay network 310. The service S1 could for example be a transcoding service i.e. to encode IP based voice from one format to another. This transcoding could be performed by the processor 901 itself having digital signaling processing capability or by a separate signaling processor (not shown). The processor(s) can be implemented as an ASIC or an FPGA.

Figure 10:
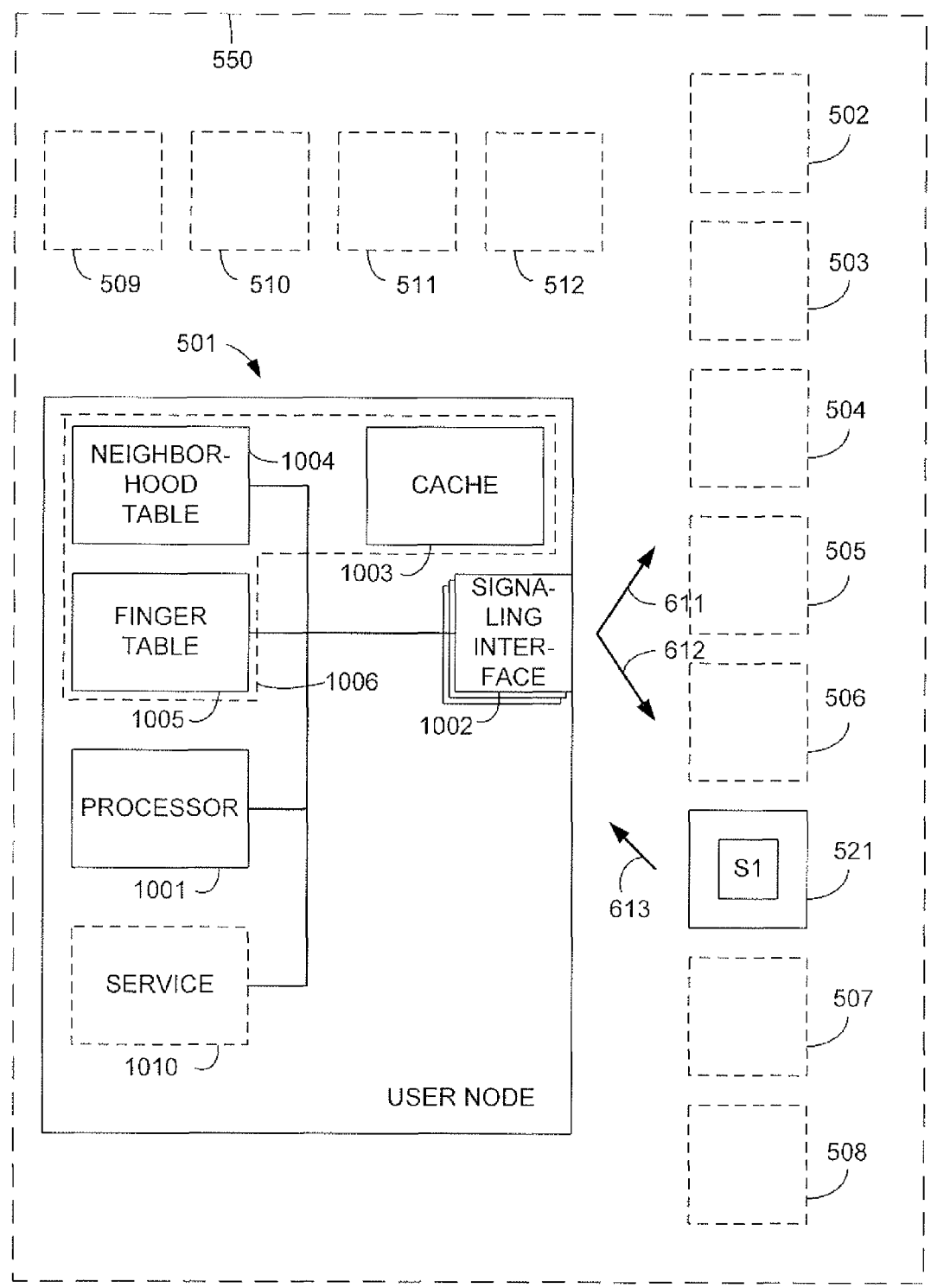
FIG. 10 is a block diagram illustrating a user node according to the current invention.

The user node 501 in FIG. 10 also comprises a processor 1001 which is adapted to communicate with one or several signaling interfaces 1002 that are adapted to send and receive different signaling messages 611-613 as described above. The processor 1001 is programmed to perform the method of grouping the object identifiers in the overlay network 550 into ranges Sector1-8 and to assign each range a sector head node 502-508. The processor 1001 is also adapted to communicate with a neighborhood table 1004 and a finger table 1005. The user node 501 can also have a cache memory 1003 for storing received service records. The tables 1004,1005 and the cache 1003 can be implemented in one or several memory areas in a memory unit 1006. As some user nodes 501 also can act as service nodes, the processor 1001 can further be adapted to communicate with one or several services 1010 in the same way as described above for the service node 321.

The invention claimed is:

1. A method for providing access to a service in a structured peer-to-peer distributed hash table based overlay communication network comprising a plurality N of nodes organized on a distributed hash table identifier ring the method characterized by the steps of:
configuring in a service node a service object so that it comprises an address pointing to the service node;
determining the number R of instances of the service object needed to be distributed among the plurality N of nodes so that any of the service object instances can be located with a predetermined probability p and with a predetermined number of service location requests sent from a user node where the number R of needed instances of the service object is determined from the equation $$R = \frac{-\ln(1-p) \times N}{\frac{1}{2} M \times \log_2(N) \times S \times (F+1)}$$

where M is the number of identical service location requests sent from the user node and being an integer having a value equal to or greater than one, where F is a replication factor being an integer having a value equal to or greater than zero, and where S is the total number of service nodes providing the same service, the number being an integer having a value equal to or greater than one;
creating R instances of the service object; and
distributing the R instances of the service object among the plurality N of nodes in the overlay network.

2. The method for providing access to a service of claim 1 where the instances of the service object are uniformly distributed among the plurality N of nodes.

3. The method for providing access to a service of claim 2 where the values of the probability p, the number M of service location requests, the number S of service nodes and the replication factor F are configured when configuring the overlay network.

4. The method for providing access to a service of claim 3 where the value of the number N of nodes in the overlay network is estimated by the service node.

5. The method for providing access to a service of claim 4 where the value of the number S of service nodes is further updated by sending service probes from the service node.

6. The method for providing access to a service of claim 1 further including the step of assigning an identity to each instance of the service object using a hash algorithm applied to the identity of the service node, the type of service provided by the service node and a number uniquely assigned to the instance.

7. The method for providing access to a service of claim 2 further including the step of assigning an identity to each instance of the service object using a hash algorithm applied to the identity of the service node, the type of service provided by the service node and a number uniquely assigned to the instance.

8. The method for providing access to a service of claim 3 further including the step of assigning an identity to each instance of the service object using a hash algorithm applied to the identity of the service node, the type of service provided by the service node and a number uniquely assigned to the instance.

9. The method for providing access to a service of claim 4 further including the step of assigning an identity to each instance of the service object using a hash algorithm applied to the identity of the service node, the type of service provided by the service node and a number uniquely assigned to the instance.

10. The method for providing access to a service of claim 5 further including the step of assigning an identity to each instance of the service object using a hash algorithm applied to the identity of the service node, the type of service provided by the service node and a number uniquely assigned to the instance.

11. A service node for providing a service in a structured peer-to-peer distributed hash table based overlay communication network comprising a plurality N of nodes organized on a distributed hash table identifier ring, the service node characterized in that it comprises:

a processor adapted to configure a service object so that it comprises an address pointing to the service node and further adapted to create a number R of instances of the service object needed to be distributed among the plurality N of nodes so that any of the instances can be located with a predetermined probability p and with a predetermined number of service location requests from a user node and to determine the number R from the equation $$R = \frac{-\ln(1-p) \times N}{\frac{1}{2} M \times \log_2(N) \times S \times (F+1)}$$

where M is the number of identical service location requests sent from the user node and being an integer having a value equal to or greater than one, where F is a replication factor being an integer having a value equal to or greater than zero, and where S is the total number of service nodes providing the same service, the number being an integer having a value equal to or greater than one; and a signaling interface adapted to communicate with the processor and further adapted to distribute the instances of the service object among the plurality N of nodes in the overlay network.

12. The service node of claim 11 where the signaling interface is further adapted to distribute the instances uniformly among the plurality N of nodes.

13. The service node of claim 12 further comprising a neighborhood table accessible from the processor and where the processor is further adapted to estimate the number of nodes N in the overlay network based on the density of node identifiers in the neighborhood table.

14. The service node of claim 13 where the signaling interface is further adapted to send service probe messages to nodes in the overlay network and to receive service probe response messages and where the processor is further adapted to estimate the number S of service nodes in the overlay network based on the received service probe result messages.

15. A method for use in a user node for locating a service in a service node in a structured peer-to-peer distributed hash table based overlay communication network comprising a plurality of nodes and where each node is assigned an object identifier on a distributed hash table identifier ring said method characterized by the steps of:

grouping the total set of object identifiers in the overlay network by dividing the identifier ring into M ranges by allocating for each range a unique number n being an integer $1 \leq n \leq M$ and determining a start object identifier value $S_n$ for each range from the equation:

$$S_n = X + (n-1) \times \frac{2^b}{M}$$

where X is the object identifier value for the user node and b is the number of bits in the binary representation of the object identifiers;

assigning for each range a sector head node having an object identifier value within the range;

sending a service location request message towards each one of the M sector head nodes where each service location request message comprises a service identifier for the service; and receiving at least one service location response carrying an address to at least one service node providing the service.

16. The method for locating a service node of claim 15 where the step of assigning a sector head node comprises the following selection:

if the range comprises an object identifier having a value equal to the value of an object identifier for a node in a finger table of the user node, select the node having this value as a sector head node;

otherwise, select the node having the start object identifier value $S_n$ for that range as a sector head node.

17. A user node for locating a service in a service node in a structured peer-to-peer distributed hash table, DHT, based overlay network comprising a plurality of nodes and where each node is assigned an object identifier and where said user node is characterized in that it comprises:

a processor adapted to group the total set of object identifiers in the overlay network by dividing a DHT identifier ring into M ranges according to the equation $$S_n = X + (n-1) \times \frac{2^b}{M}$$

where $S_n$ is the value of a start identifier from where the range n starts, $1 \leq n \leq M$, X is the user node's own object identifier, b is the number of bits in the binary representation of the object identifiers and assign for each range a sector head node having an object identifier value within the range; and a signaling interface adapted to communicate with the processor and further adapted to send service location request messages towards each one of the M sector head nodes where each service location request message comprises a service identifier for the service and where the signaling interface is further adapted to receive at least one service location response message carrying an address to the service node.

18. The user node of claim 17 further comprising a memory unit adapted to cache data from the received service location responses.

* * * * *

UNITED STATES PATENT AND TRADEMARK OFFICE
CERTIFICATE OF CORRECTION

PATENT NO.         : 8,495,130 B2
APPLICATION NO.    : 13/498323
DATED              : July 23, 2013
INVENTOR(S)        : Maenpaa et al.

It is certified that error appears in the above-identified patent and that said Letters Patent is hereby corrected as shown below:

In the Specification

In Column 6, Line 63, delete "at al" and insert -- et al --, therefor.

In Column 7, Line 20, delete "object" and insert -- object O1 --, therefor.

In Column 7, Line 63, delete "that and" and insert -- that K=1 and --, therefor.

In Column 12, Line 29, delete "node z" and insert -- node Z --, therefor.

Signed and Sealed this
Twenty-sixth Day of November, 2013

Margaret A. Focarino
*Commissioner for Patents of the United States Patent and Trademark Office*